(12) United States Patent
Ramamurthy et al.

(10) Patent No.: US 11,261,107 B2
(45) Date of Patent: Mar. 1, 2022

(54) DESALINATION USING PRESSURE VESSELS

(71) Applicant: Energy Harbors Corporation, Inc., Saratoga, CA (US)

(72) Inventors: Shankar Ramamurthy, Saratoga, CA (US); Shankar Nataraj, Allentown, PA (US)

(73) Assignee: Energy Internet Corporation, Saratoga, CA (US)

( * ) Notice: Subject to any disclaimer, the term of this patent is extended or adjusted under 35 U.S.C. 154(b) by 0 days.

(21) Appl. No.: 17/072,061

(22) Filed: Oct. 16, 2020

(65) Prior Publication Data

US 2021/0032129 A1 Feb. 4, 2021

Related U.S. Application Data

(63) Continuation-in-part of application No. 16/378,243, filed on Apr. 8, 2019, now Pat. No. 10,947,899.
(Continued)

(51) Int. Cl.
*C02F 1/44* (2006.01)
*C02F 1/00* (2006.01)
*C02F 103/08* (2006.01)

(52) U.S. Cl.
CPC ............ *C02F 1/441* (2013.01); *C02F 1/008* (2013.01); *C02F 2103/08* (2013.01); *C02F 2201/005* (2013.01)

(58) Field of Classification Search
CPC .... F02C 6/16; G06Q 50/06; G06Q 10/06314; G06Q 10/06312; Y02E 60/16;
(Continued)

(56) References Cited

U.S. PATENT DOCUMENTS 6,658,855 B1 * 12/2003 Iles .......................... F02C 7/08
60/772
9,540,957 B2 1/2017 Shinnar et al.
(Continued)

FOREIGN PATENT DOCUMENTS

JP 2011083764 A 4/2011
KR 2011083764 B1 4/2018
WO WO2015123784 A1 8/2015

*Primary Examiner* — Ziaul Karim
(74) *Attorney, Agent, or Firm* — Adams Intellex, PLC

(57) ABSTRACT

Disclosed techniques include desalination using pressure vessels. Access to a set of at least three pressure vessels is obtained. The pressure vessels are interconnected using piping and computer-controlled switching valves. A first pressure vessel of the set is filled with a prepurified liquid. A second pressure vessel of the set is filled with a pressurized gas. The pressurized gas is sharp interface immiscible with the prepurified liquid. The switching valves are controlled to enable the pressurized gas in the second pressure vessel to force the prepurified liquid from the first pressure vessel into a reverse osmosis chamber. The switching valves are controlled to enable a third pressure vessel of the set to fill with additional prepurified liquid. The switching valves are controlled to enable the pressurized gas that entered the first pressure vessel to force the additional prepurified liquid from the third pressure vessel into the reverse osmosis chamber.

26 Claims, 8 Drawing Sheets

Related U.S. Application Data which is a continuation-in-part of application No. 16/118,886, filed on Aug. 31, 2018, now Pat. No. 10,725,441.

(60) Provisional application No. 63/048,032, filed on Jul. 3, 2020, provisional application No. 63/047,188, filed on Jul. 1, 2020, provisional application No. 62/981,629, filed on Feb. 26, 2020, provisional application No. 62/916,449, filed on Oct. 17, 2019, provisional application No. 62/795,133, filed on Jan. 22, 2019, provisional application No. 62/784,582, filed on Dec. 24, 2018, provisional application No. 62/679,051, filed on Jun. 1, 2018, provisional application No. 62/654,718, filed on Apr. 9, 2018, provisional application No. 62/654,859, filed on Apr. 9, 2018, provisional application No. 62/552,747, filed on Aug. 31, 2017, provisional application No. 62/795,140, filed on Jan. 22, 2019.

(58) Field of Classification Search
CPC ........ H02J 2203/20; H02J 3/28; H02J 15/003; H02J 15/006; H02J 15/00
See application file for complete search history.

(56) References Cited

U.S. PATENT DOCUMENTS

| | | |
|---|---|---|
| 9,562,183 B2 | 2/2017 | Hidalgo et al. |
| 9,568,235 B2 | 2/2017 | Dobbs |
| 9,631,846 B2 | 4/2017 | Chen et al. |
| 9,651,030 B2 | 5/2017 | Kim et al. |
| 9,664,140 B2 | 5/2017 | Kalika |
| 10,563,621 B2 | 2/2020 | Pages |
| 2003/0036806 A1 | 2/2003 | Schienbein et al. |
| 2007/0151915 A1* | 7/2007 | Barber .................. B01D 61/08 210/321.65 |
| 2008/0046387 A1 | 2/2008 | Gopal et al. |
| 2008/0071705 A1* | 3/2008 | Enis .......................... H02J 3/28 705/412 |
| 2008/0172279 A1 | 7/2008 | Enis et al. |
| 2009/0107917 A1* | 4/2009 | Capehart .................. C02F 9/00 210/638 |
| 2009/0200805 A1 | 8/2009 | Kim et al. |
| 2009/0319090 A1 | 12/2009 | Dillon et al. |
| 2010/0270237 A1 | 10/2010 | Efraty |
| 2010/0308765 A1 | 12/2010 | Moore et al. |
| 2012/0053737 A1 | 3/2012 | Valluri et al. |
| 2013/0336721 A1* | 12/2013 | McBride ................. E21D 11/00 405/55 |
| 2014/0039710 A1 | 2/2014 | Carter et al. |
| 2014/0129042 A1 | 5/2014 | Miner |
| 2014/0172182 A1 | 6/2014 | Subbotin et al. |
| 2014/0261288 A1* | 9/2014 | Coney ....................... F02G 3/00 123/197.1 |
| 2015/0033724 A1 | 2/2015 | Fong et al. |
| 2015/0143806 A1 | 5/2015 | Friesth |
| 2016/0336928 A1 | 11/2016 | Kuznetsov |
| 2017/0005515 A1 | 1/2017 | Sanders |
| 2017/0038157 A1 | 2/2017 | O'Donnell et al. |
| 2017/0044414 A1 | 2/2017 | Sutterlin et al. |
| 2017/0067667 A1 | 3/2017 | Choi |
| 2017/0082060 A1 | 3/2017 | Kalika |
| 2017/0082123 A1 | 3/2017 | Momen et al. |
| 2017/0082380 A1 | 3/2017 | Gauche et al. |
| 2017/0159495 A1 | 6/2017 | Laughlin et al. |
| 2019/0003425 A1 | 1/2019 | Pages |
| 2019/0056174 A1 | 2/2019 | Ragot et al. |
| 2019/0160431 A1 | 5/2019 | Warsinger |
| 2019/0300394 A1 | 10/2019 | Miyakawa |

\* cited by examiner

DESALINATION USING PRESSURE VESSELS

RELATED APPLICATIONS

This application claims the benefit of U.S. provisional patent applications "Desalination Using Pressure Vessels" Ser. No. 62/916,449, filed Oct. 17, 2019, "Controlled Liquefaction and Energy Management" Ser. No. 62/981,629, filed Feb. 26, 2020, "Energy Transfer Using High-Pressure Vessel" Ser. No. 63/047,188, filed Jul. 1, 2020, and "Controlled Liquefaction Using Compatible Materials for Energy Management" Ser. No. 63/048,032, filed Jul. 3, 2020.

This application is also a continuation-in-part of U.S. patent application "Energy Storage and Management Using Pumping" Ser. No. 16/378,243, filed Apr. 8, 2019, which claims the benefit of U.S. provisional patent applications "Modularized Energy Management Using Pooling" Ser. No. 62/654,718, filed Apr. 9, 2018, "Energy Storage and Management Using Pumping" Ser. No. 62/654,859, filed Apr. 9, 2018, "Power Management Across Point of Source to Point of Load" Ser. No. 62/679,051, filed Jun. 1, 2018, "Energy Management Using Pressure Amplification" Ser. No. 62/784,582, filed Dec. 24, 2018, "Energy Management Using a Converged Infrastructure" Ser. No. 62/795,140, filed Jan. 22, 2019, and "Energy Management Using Electronic Flywheel" Ser. No. 62/795,133, filed Jan. 22, 2019.

The U.S. patent application "Energy Storage and Management Using Pumping" Ser. No. 16/378,243, filed Apr. 8, 2019, is also a continuation-in-part of U.S. patent application "Energy Management with Multiple Pressurized Storage Elements" Ser. No. 16/118,886, filed Aug. 31, 2018, which claims the benefit of U.S. provisional patent applications "Energy Management with Multiple Pressurized Storage Elements" Ser. No. 62/552,747, filed Aug. 31, 2017, "Modularized Energy Management Using Pooling" Ser. No. 62/654,718, filed Apr. 9, 2018, "Energy Storage and Management Using Pumping" Ser. No. 62/654,859, filed Apr. 9, 2018, and "Power Management Across Point of Source to Point of Load" Ser. No. 62/679,051, filed Jun. 1, 2018.

Each of the foregoing applications is hereby incorporated by reference in its entirety.

FIELD OF ART

This application relates generally to liquid purification systems and more particularly to desalination using pressure vessels.

BACKGROUND

Throughout the world, the demand for potable water is presently increasing at an ever accelerating rate. While some countries are struggling to reduce their water demands, to find new and reliable water sources, and to revamp or expand their often-inadequate water distribution infrastructures, others are increasing water usage. The increasing need for potable water is being driven by growing world population, by expansion into arid or semiarid regions, and by development-driven demand. The development-driven demand is in turn impelled by the expansion of cities and towns, the surge in commerce and manufacturing, and the increased demand for irrigation to support agriculture, to name only a few. Potable water is further needed for self-contained and specialized applications. Potable water for drinking, cooking, bathing, and cleaning is needed onboard military and commercial ships, on drilling platforms, at remote outposts, and in areas where ground water or surface water is unobtainable or contaminated. Cities, states, and countries have tried to address water scarcities and demand shortfalls by drilling increased numbers of wells that plunge to greater depths. While these wells have provided some short-term relief to water demands, the wells have themselves created dire problems. Dropping groundwater levels, ground subsidence, collapsed subterranean domes, sink holes, and so on, have all resulted from too much water being drawn out of the ground too quickly.

Increasing water demand has many root causes. The increased demand and the overconsumption of water have imposed strains on groundwater and surface water sources. The attention of governments and others who are looking for sources of water is being directed toward the oceans. The oceans cover approximately 70 percent of the surface of the earth, yet are not potable—two facts well known to any sailor. Further, the oceans hold over 90 percent of the water on earth. The ocean water is not potable principally because the water contains high concentrations of salt, while contaminants and pollutants are further contributing factors. Salt in the high concentrations of ocean water is toxic to humans and to many other land animals. Desalination of ocean water is an intriguing possibility to meet potable water needs. Businesses, government agencies, and prudent or responsible water consumers also endeavor to initiate, practice, and enforce water conservation measures. Consumers can reduce or control their water usage "footprints" by turning off faucets when not being used; watering plantings and lawns at night; installing water restricting shower heads and low flush toilets; or purchasing low water use appliances. Each of these simple approaches, which range from low cost to expensive; is a popular approach to water conservation. An added benefit is that reduced water usage also reduces cost of running a household, business, or farm. While concerted conservation efforts do help, the demand for water—and particularly potable water—continues to outstrip the savings attributable to water conservation measured alone. The growth of towns, cities, states, and countries increases the demand for potable water, resulting in what many analysts identify as a water crisis.

To meet the many increases in water and potable water demands, public officials at national, state, and local levels, plus city and regional planners, have been confronted with choosing among three broad solutions: to increase sources of water by drilling new deep wells, to reduce water demand through designed and enforced water conservation, or to implement a prudent combination of both these strategies. Further, the distribution of water from pumping sources to water consumers is frequently identified as a hindrance to solving the water crisis. In many municipalities, existing water distribution infrastructure is inadequate to meet demand. The aging filtration and distribution facilities are unable to keep pace with the increased water demands. In addition, poor decisions made by government officials have caused toxic chemicals to be introduced into the water systems or leached from outdated piping. Solutions to these problems are nontrivial. Legal wrangling over who is responsible, infrastructure replacement or construction delays, pollution mitigation requirements, overwhelming costs, or even war, have prevented, halted, or delayed new water filtration and distribution facilities from coming online. Water loss and wastage remain perennial concerns. Aging appliances or manufacturing equipment, poor usage plans, and leaking distribution infrastructure, all waste water in comparison to their modern counterparts.

SUMMARY

Desalination of prepurified liquid such as brine, saline water, seawater, or brackish water is performed to produce potable water. The demand for potable water is on the increase worldwide. Disclosed techniques enable a liquid purification system, such as a desalination system, with high yield that can provide potable water for drinking, agriculture, and so on. Desalination systems are needed in areas of the globe that lack potable water or are unable to provide potable water in sufficient amounts to meet local demand.

To pressurize a prepurified liquid, such as brine, for a reverse osmosis (RO) system, a "gas piston" approach is disclosed. The gas piston, which is based on a pressurized gas that is sharp interface immiscible with brine, can force brine onto the semipermeable membrane. This gas piston comprises no moving parts and can be controlled using valves and pressure vessels. The gas piston can be transferred from pressure vessel to pressure vessel in order to enable a continuous feed of brine to the RO component. A plurality of pressure vessels can be used for enabling a liquid purification system, such as a desalination system. The desalination system can include pumps that can be operated using nearly any available power source. Further, gas piston desalination components can support various pressures as required by currently-available RO technology without retrofitting.

Disclosed techniques address desalination using pressure vessels. Access to at least three pressure vessels is obtained, where the pressure vessels are interconnected using piping and computer-controlled switching valves. A first pressure vessel of the at least three pressure vessels is filled with brine and a second pressure vessel of the at least three pressure vessels is filled with a pressurized gas, wherein the pressurized gas is sharp interface immiscible with brine. The switching valves are controlled to enable the pressurized gas in the second pressure vessel to force the brine from the first pressure vessel into a reverse osmosis chamber upon entering the first pressure vessel. The switching valves are controlled to enable a third pressure vessel of the at least three pressure vessels to fill with additional brine, wherein the additional brine, upon further controlling the switching valves, is forced into the reverse osmosis chamber by the pressurized gas that entered the first pressure vessel. The first pressure vessel, the second pressure vessel, and the third pressure vessel switch their functions cyclically to enable continuous filling of the reverse osmosis chamber. The technique further comprises obtaining access to a fourth pressure vessel, wherein the fourth pressure vessel is enabled to fill with reverse osmosis retentate while the third pressure vessel fills with additional brine. Function of the third and fourth pressure vessels rotate cyclically as a pair to enable reverse osmosis retentate management.

A computer-implemented method for enabling a liquid purification system is disclosed comprising: obtaining access to a set of at least three pressure vessels, where the pressure vessels are interconnected using piping and computer-controlled switching valves; filling a first pressure vessel of the set with a prepurified liquid and filling a second pressure vessel of the set with a pressurized gas, wherein the pressurized gas is sharp interface immiscible with the prepurified liquid; controlling the switching valves to enable the pressurized gas in the second pressure vessel to force the prepurified liquid from the first pressure vessel into a reverse osmosis chamber; and controlling further the switching valves to enable a third pressure vessel of the set to fill with additional prepurified liquid, wherein the additional prepurified liquid, upon further controlling the switching valves, is forced into the reverse osmosis chamber by the pressurized gas that entered the first pressure vessel.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
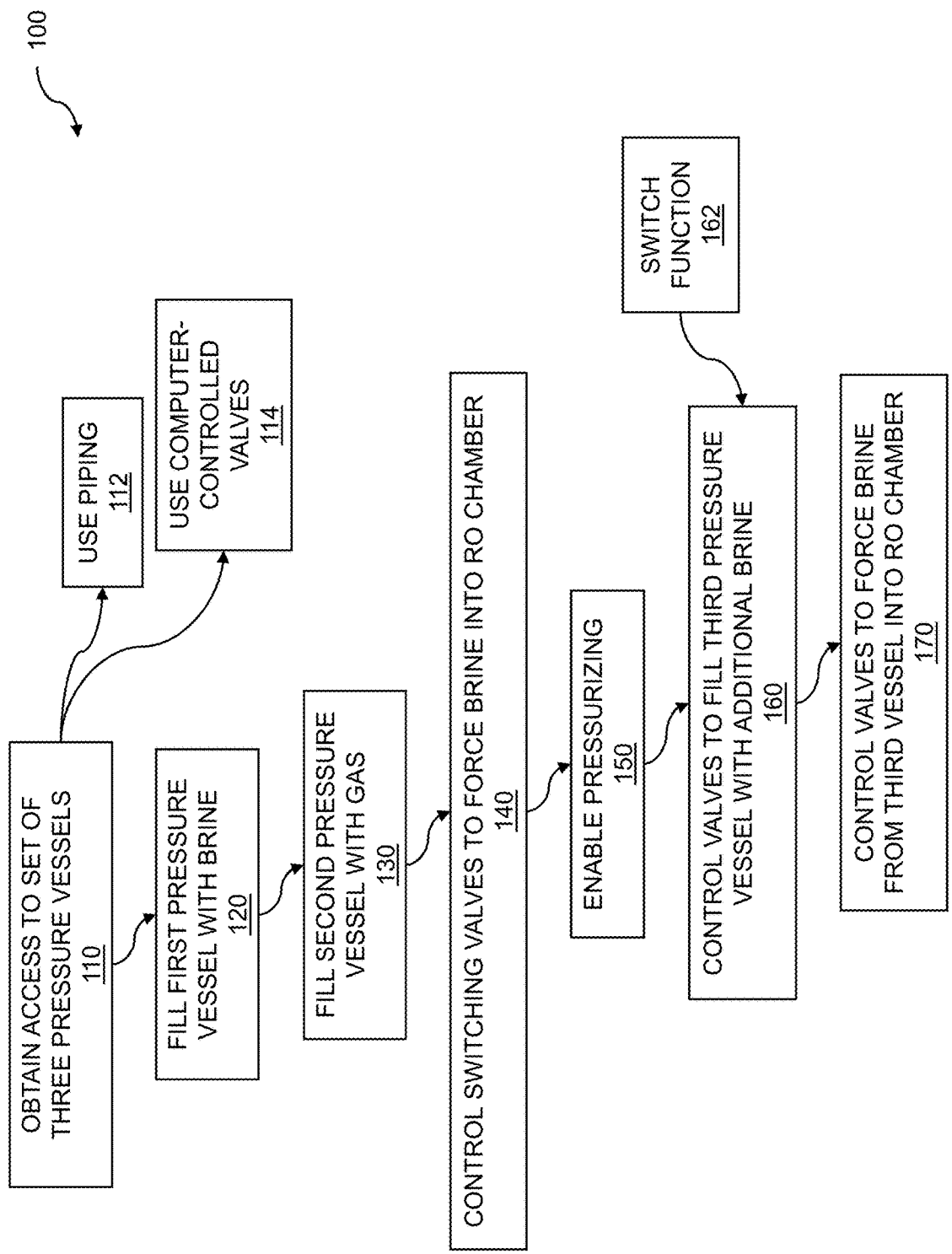
FIG. 1 is a flow diagram for enabling a liquid purification system using pressure vessels.

This disclosure provides techniques for enabling a liquid purification system, such as a desalination system, where the desalination uses pressure vessels. The objective of desalination is to remove salt and minerals present in brine to produce potable or "fresh" water. The resulting water can be suitable for drinking, bathing, and other human consumption; can be used for irrigation for agriculture; and so on. The brine generally can include saltwater, saline water, seawater, brackish water, and so on. Desalination systems have been used onboard various types of ships such as surface ships and submarines, in areas of the globe that are without potable water or that cannot provide sufficient quantities of potable water, etc. The desalination systems can be simple and small or large and complex. A simple, small-scale desalination system can be based on a portable, or nearly so, solar evaporator. The solar evaporator can heat brine by capturing solar energy, removing the water from the brine by evaporation. Such a solar desalination system can be produced at low cost and can be widely distributed for installation where potable water needs are acute. A complex desalination system can be based on reverse osmosis. Using a reverse osmosis technique, brine is applied under pressure to a semipermeable membrane. The semipermeable membrane can permit the transfer of water through the membrane while retaining the salt at the membrane.

In disclosed techniques, a liquid purification system, such as a desalination system, is enabled using pressure vessels. The desalination system can operate on a prepurified liquid, such as brine or brackish water, to produce fresh water for human consumption and for agriculture. The prepurified liquid can be sourced from seawater, brackish water, saline water, system effluent, and so on. A "gas piston" comprising a pressurized gas can be used to pressurize brine, to force brine from a pressure vessel to a reverse osmosis chamber, etc. The gas piston, which is based on a pressurized gas such as air that is sharp interface immiscible with brine, can force the brine onto the semipermeable membrane of the RO chamber. This gas piston comprises no moving parts and can be controlled using switching valves and at least three pressure vessels. The gas piston can be transferred from one pressure vessel to another pressure vessel to enable a continuous feed of brine to the RO chamber. The liquid purification system can include pumps, where the pumps can be used to pressurize or "bootstrap" the RO chamber, to boost brine pressure to compensate for pressure losses in pipes or manifolds, and so on. The liquid purification system that uses pressure vessels can operate on a variety of power sources. Pumps, for example, can be operated using electrical energy; a pump-turbine can be operated by forcing gas, steam, or liquid past the turbine; and so on. The gas piston desalination components can be retrofitted to existing desalination systems.

Desalination is based on using pressure vessels. At least three pressure vessels are obtained, where the pressure vessels are interconnected using piping and computer-controlled switching valves. The valves can include on-off valves, adjustable valves, and so on. A first pressure vessel of the at least three pressure vessels is filled with brine, and a second pressure vessel is filled with a pressurized or compressed gas. The pressurized gas can operate as a "gas piston" when the gas is sharp interface immiscible with brine. The switching values are controlled to enable the pressurized gas or gas piston in the second pressure vessel to force the brine from the first pressure vessel into a reverse osmosis chamber upon entering the first pressure vessel. The switching valves are further controlled to enable a third pressure vessel of the at least three pressure vessels to fill with additional brine. The additional brine, upon further controlling the switching valves, is forced into the reverse osmosis chamber by the pressurized gas that entered the first pressure vessel. The first pressure vessel, the second pressure vessel, and the third pressure vessel switch their functions cyclically. The cyclical switching of functions of the vessels can enable continuous filling of the reverse osmosis chamber.

FIG. 1 is a flow diagram for enabling a liquid purification system using pressure vessels. Pressure vessels, including high pressure vessels, can be alternately configured to hold a pressurized gas and pressurized brine. The pressurized gas can include air or other gas, and the gas can be sharp interface immiscible with the brine. The brine can include saline water, seawater, brackish water, and so on. The pressurizing of the gas or the brine can be accomplished using a pump, a pump-turbine, and so on. The pump can be operated by providing electrical energy. In embodiments, the pump-turbine can be operated by providing pressurized gas, water, steam, or another energy source that can spin the turbine of the pump-turbine. As salt is removed from the brine as part of the desalination technique, retentate can be produced. Energy within the retentate, such as thermal energy, can be recaptured. The recaptured energy can be stored, used to operate the desalination process, and so on. The liquid purification system based on pressure vessels can be used with a reverse osmosis (RO) system. The liquid purification system, such as a desalination system based on pressure vessels, can be added to an existing RO system by retrofitting the existing RO systems with chambers and switching valves, as described below.

Access to at least three pressure vessels is obtained. Functions of the three vessels can be switched cyclically, where the functions can include moving liquid into or out of a first vessel, retaining a stationary pressurized gas in a second vessel, and retaining a stationary liquid in a third vessel. The function of each of the vessels can then switch to one of the other functions. The pressure vessels can be connected using piping and computer-controlled valves. A first pressure vessel of the at least three pressure vessels can be filled with brine and a second pressure vessel of the at least three pressure vessels can be filled with a pressurized gas, where the pressurized gas is sharp interface immiscible with brine. The switching valves, which can include smart valves, can be controlled to enable the pressurized gas in the second pressure vessel to force the brine from the first pressure vessel into a reverse osmosis chamber upon entering the first pressure vessel. The pressurized gas can provide a piston function. The gas piston can be used in lieu of a mechanical piston. The switching valve can be further controlled to enable a third pressure vessel of the at least three pressure vessels to fill with additional brine, where the additional brine, upon further controlling of the switching valves, is forced into the reverse osmosis chamber by the pressurized gas that entered the first pressure vessel. Further pressure vessels, such as a fourth pressure vessel and so on, can be used. The functions of the third and fourth pressure vessels can rotate cyclically to enable reverse osmosis retentate management.

The flow 100 includes obtaining access to a set of at least three pressure vessels 110. The pressure vessels can be located above ground, below ground, submerged in water, etc. The pressure vessels can include unused oil infrastructure such as unused or non-productive oil well infrastructure, unused salt caverns, aquifers, large cavities underground, or porous rock structures capable of holding air or water under pressure. The pressure vessels can include pressure vessels of substantially similar sizes or pressure vessels of substantially different sizes. In the flow 100, the pressure vessels can be interconnected using piping 112. The piping can include pipes directly connected between or among vessels, piping connected to one or more manifolds, and so on. The piping can include pressure amplification piping. In the flow 100, the pressure vessels can be interconnected using computer-controlled switching valves 114. The computer-controlled valves can include on-off valves, adjustable valves, and the like. The computer-controlled valves can be controlled by a processor such as a microprocessor or a microcontroller; a computing device such as a laptop computer or a tablet, etc.

The flow 100 includes filling a first pressure vessel of the at least three pressure vessels with brine 120. The brine can include saltwater, saline water, seawater, brackish water, and so on. The concentration of salt within the brine can range from a low concentration to a high concentration. In embodiments, the first pressure vessel can be filled with brine at low pressure. The low pressure at which the first pressure vessel can be filled with brine can include 1 or more bar. In embodiments, the low pressure is substantially at the pressure of an input prepurified liquid feed, such as brine. The pressure of the input brine feed can be adjusted using a low-pressure pump, a pump-turbine, and the like. In embodiments, the low pressure can be within 10% of the head pressure of the input prepurified liquid feed. The flow 100 includes filling a second pressure vessel of the at least three pressure vessels with a pressurized gas 130. The gas can include air or another gas. In embodiments, the pressurized gas is sharp interface immiscible with brine. A small percentage of the pressurized gas can dissolve into the brine. Discussed below, the function of the first pressure vessel and the second pressure can be switched cyclically.

The flow 100 includes controlling the switching valves to enable the pressurized gas in the second pressure vessel to force the brine 140 from the first pressure vessel into a reverse osmosis (RO) chamber upon entering the first pressure vessel. The switching valves can control filling a pressure vessel, emptying a pressure vessel, transferring the contents of a pressure vessel to another pressure vessel, and so on. In embodiments, the pressurized gas in the second pressure vessel can provide a piston function to force the brine from the first pressure vessel. The piston function provided by the pressurized gas can be used as a gas analogy of a mechanical piston. The gas piston can require no moving components. In other embodiments, the brine can be pre-purified before entering the reverse osmosis chamber. The pre-purifying can include removing organic and inorganic materials from the brine. The pre-purifying can be accomplished using a filter, a screen, a membrane, and the like. The flow 100 includes enabling pressurizing 150 the brine that is forced from the first pressure vessel into the reverse osmosis chamber. The pressurizing can include providing pressure in addition to the pressure that can be provided by the pressurized gas. Some embodiments comprise enabling additional pressurization of the prepurified liquid that is forced from the first pressure vessel into the reverse osmosis chamber. In embodiments, the pressurizing can be enabled by a booster pump between the first pressure vessels and the reverse osmosis chamber.

The flow 100 includes controlling the switching valves to enable a third pressure vessel of the at least three pressure vessels to fill with additional brine 160. The additional brine can include fresh brine, retentate, and so on. The fresh brine can be obtained from the same source as the brine used to fill the first pressure vessel or can be obtained from a separate source. The brine used to the fill the first pressure vessel can have substantially similar saline concentrations to the brine used to fill the third pressure vessel, or can have substantially different saline concentrations. In the flow 100, the first pressure vessel, the second pressure vessel, and the third pressure vessel can switch their functions 162 cyclically to enable continuous filling of the reverse osmosis chamber. The continuous filling can be attained by filling the RO chamber from one vessel by draining that vessel, while another vessel is being filled. The filled vessel can then be drained while the empty vessel is being filled. In embodiments, the continuous filling can provide for movement of the pressurized gas cyclically from pressure vessel to pressure vessel. The movement of the pressurized gas can be achieved by controlling one or more switching valves. A pump, such as a booster pump, can be used to maintain a target or threshold pressure for the pressurized gas to compensate for losses, gas dissolving into brine, etc. In embodiments, the booster pump function is accomplished by a pressure vessel operating as an additional source of pressure for the system. In the flow 100, the additional brine, upon further controlling the switching valves, is forced into the reverse osmosis chamber 170 by the pressurized gas that entered the first pressure vessel. The functions of the pressure vessels that supplied the brine to the RO can be switched, and the desalination can continue. Some embodiments comprise additional pressure vessels to enable one or more of initial purification, final purification, and distribution of the prepurified liquid. Thus, multiple components can be supported at multiple pressures to provide multiple functions using the disclosed techniques.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
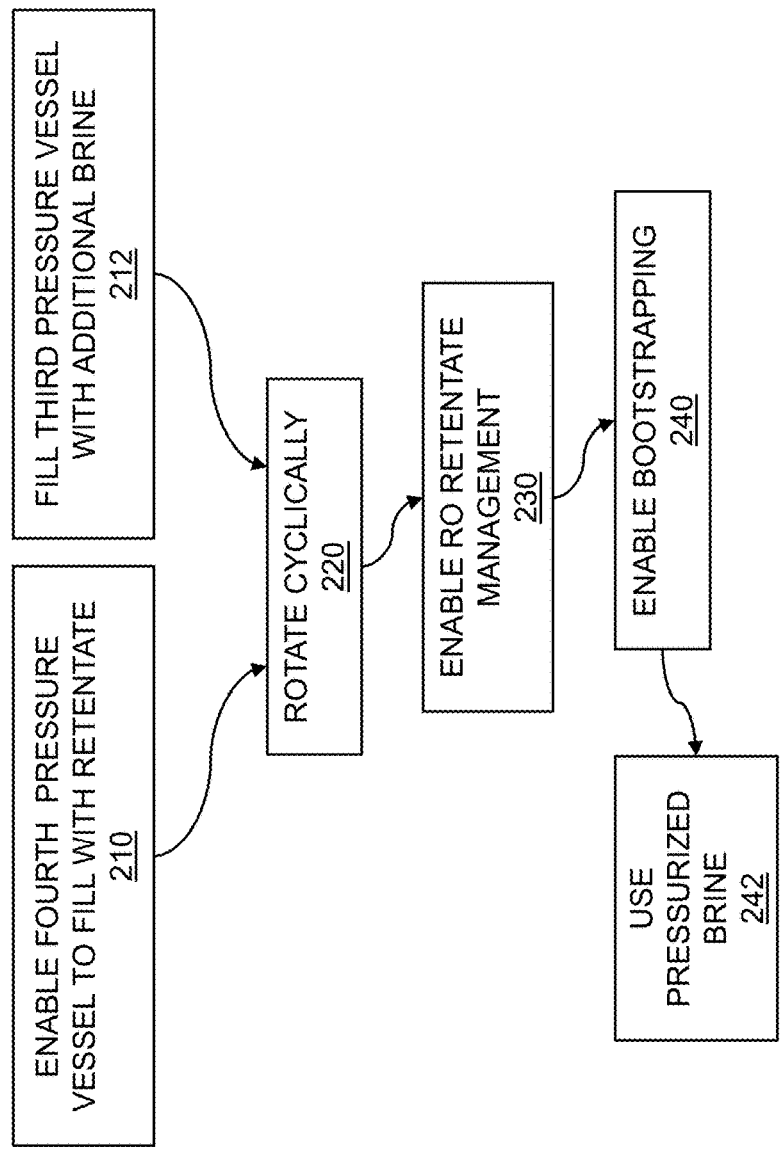
FIG. 2 is a flow diagram for fourth pressure vessel usage.

FIG. 2 is a flow diagram for fourth pressure vessel usage. Discussed throughout, at least three pressure vessels can be used for enabling a liquid purification system. Pressure vessels from the at least three pressure vessels can switch their functions cyclically to enable continuous filling of a reverse osmosis (RO) chamber. The continuous filling can provide for movement of a "piston" of pressurized gas cyclically from pressure vessel to pressure vessel, where the movement of the gas piston is controlled by switching valves. The gas can include air or another gas that is sharp interface immiscible with brine. Access to at least three pressure vessels is obtained, where the pressure vessels are interconnected using piping and computer-controlled switching valves. A first pressure vessel of the at least three pressure vessels is filled with brine and a second pressure vessel of the at least three pressure vessels is filled with a pressurized gas, wherein the pressurized gas is sharp interface immiscible with brine. Only a small fraction of the gas that is sharp interface immiscible with the brine can dissolve into the brine. The switching valves are controlled to enable the pressurized gas in the second pressure vessel to force the brine from the first pressure vessel into a reverse osmosis chamber upon entering the first pressure vessel. The switching valves are controlled to enable a third pressure vessel of the at least three pressure vessels to fill with additional brine, wherein the additional brine, upon further controlling the switching valves, is forced into the reverse osmosis chamber by the pressurized gas that entered the first pressure vessel.

The flow 200 includes a fourth pressure vessel, where the fourth pressure vessel is enabled to fill with reverse osmosis retentate 210. The enabling of the fourth pressure vessel to be filled with reverse osmosis retentate can be accomplished using one or more switching valves. The switching valves can include on-off valves, adjustable valves, smart valves, and so on. The control of the valves can be accomplished using a processor such as a microprocessor or microcontroller, a computing device such as a laptop or tablet, and so on. The flow 200 further includes filling a third pressure vessel 212 with additional brine. The filling of the third pressure vessel with additional brine can be accomplished using a pump such as a low-head fill pump. The brine can include saline water, seawater, and so on. In the flow 200, function of the third and fourth pressure vessels rotates cyclically 220 as a pair. The functions of the third and fourth pressure vessels can include a vessel filling or being filled with reverse osmosis retentate, a vessel filling or being filled with a gas such as air, and so on. The rotating cyclically can include filling the pressure vessel previously filled with reverse osmosis retentate with gas, and filling the pressure vessel previously filled with gas with reverse osmosis retentate.

In the flow 200, cyclically rotating the function of the third and fourth pressure vessels enables reverse osmosis retentate management 230. The reverse osmosis retentate management can include removing the retentate continuously from the RO chamber to pressure vessels. When the fourth pressure vessel has become full and is being emptied, the third pressure vessel can be filled with reverse osmosis retentate from the RO chamber. When the third pressure vessel becomes full and requires emptying, the fourth pressure vessel can be filled, and so on. The cyclical rotation of function of the third and fourth pressure vessels can enable the continuous management of the reverse osmosis retentate. The cyclical rotation of function can include other pressure vessels. In the flow 200, the fourth pressure vessel enables liquid purification system bootstrapping 240 using only pressurized prepurified liquid. The bootstrapping can include filling the fourth pressure vessel as part of a bring-up technique for the liquid purification system. In the flow 200, the purification system bootstrapping uses only pressurized brine 242. The pressurized brine can be used to pressurize the gas such as air. In embodiments, the bootstrapping is initialized by a high-pressure pump. The high-pressure pump can be used to move brine directly from an input to the RO chamber. In embodiments, the high-pressure pump pressurizes an input prepurified liquid feed to a reverse osmosis pressure. In embodiments, the bootstrapping is initialized by a pressurized gas pressure vessel.

Figure 3:
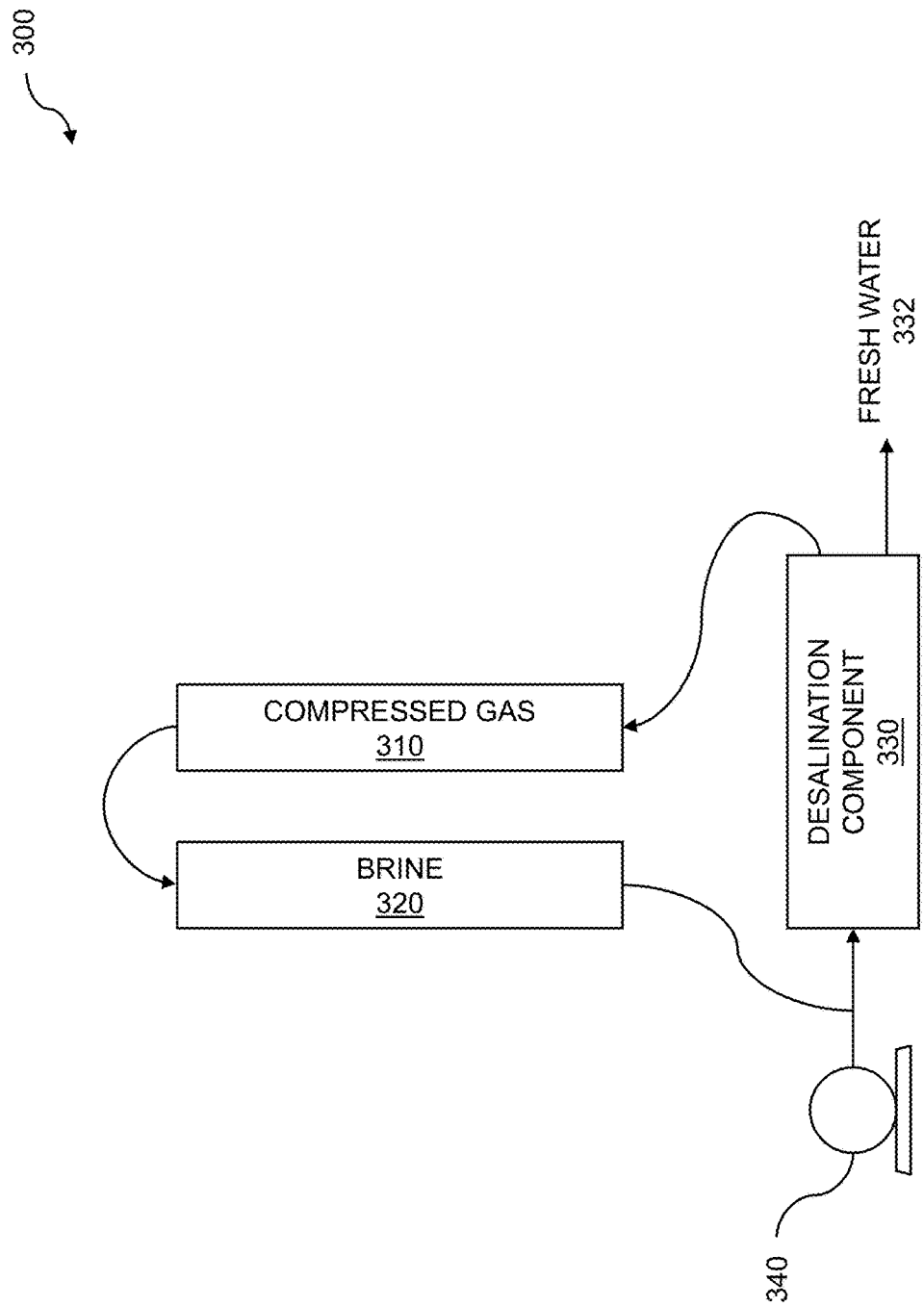
FIG. 3 is a system diagram for desalination.

FIG. 3 is a system diagram for desalination 300. Desalination can be used to convert brine, saline liquid, seawater, and so on to fresh or potable water by extracting salt from the water. Desalination can be accomplished using a variety of techniques, where the techniques can include providing brine or other salty liquid under pressure to a reverse osmosis (RO) chamber. The applying pressure to the brine can be accomplished using a gas-brine piston. The gas-brine piston can be used to enable a liquid purification system, such as a desalination system. The gas-brine piston can be used to force brine from a vessel into the RO chamber. The gas-brine piston can enable desalination using pressure vessels. Access to at least three pressure vessels is obtained, where the pressure vessels are interconnected using piping and computer-controlled switching valves. A first pressure vessel of the at least three pressure vessels is filled with brine and a second pressure vessel of the at least three pressure vessels is filled with a pressurized gas, where the pressurized gas is sharp interface immiscible with brine. The switching valves are controlled to enable the pressurized gas in the second pressure vessel to force the brine from the first pressure vessel into a reverse osmosis chamber upon entering the first pressure vessel. The switching valves are controlled to enable a third pressure vessel of the at least three pressure vessels to fill with additional brine, wherein the additional brine, upon further controlling the switching valves, is forced into the reverse osmosis chamber by the pressurized gas that entered the first pressure vessel.

Desalination can be accomplished using a pressure recovery/exchange technique, where a pressure recover/exchange technique can be based on using a set of high-pressure vessels (PVs). The pressure vessels can be filled and emptied cyclically by controlling the filling and the emptying using switching valves. The switching valves can include smart valves, where the smart valves can be controlled using a processor, a computing device, and so on. A first high pressure vessel 310 can be initially charged with a high-pressure column of pressurized gas. In embodiments, the pressurized gas can include pressurized air. A high-pressure RO retentate can begin to fill the pressurized vessel 310, beginning at the bottom of the vessel. A second-high pressure vessel 320 can be initially filled with a brine, fresh saline water, seawater, or another feed. In embodiments, brackish water or other non-saline, non-potable brine is used. The high-pressure gas within the vessel 310 can flow out of the top of pressure vessel 310 into the top of another similar pressure vessel such as 320. The flow of gas from 310 to 320 can be accomplished using piping, a manifold, and so on. The brine or other liquid within 320 is forced under pressure of the "gas piston" from 310 into the RO component 330 for desalination treatment. Fresh water 332 can be removed from the desalination component 330. High saline retentate from the desalination component 330 can be forced into high pressure vessel 310. This high saline retentate can include the high saline retentate used to fill 310 as described above.

The desalination of the brine in the pressure vessel 320 can proceed until it is empty of brine. Further, the high saline retentate transferred into high pressure vessel 310 can eventually fill the vessel. The filled vessel 310 can be drained and refilled with fresh brine at ambient pressure. The high-pressure column of gas initially within the pressure vessel 310 now fills pressure vessel 320. The functions of the two high pressure vessels have been effectively switched. The high-pressure saline retentate can be rerouted from vessel 310 into vessel 320. The transferring of the gas from 310 to 320 can be repeated, where repeating the transfer can desalinate the fresh brine. The routing of fluid streams can be controlled using switching valves. In embodiments, the RO component and a pump for fresh water can operate continuously at steady conditions. The pressure vessels can switch their function cyclically. By having a minimum of three pressure vessels, continuous operation of the RO component can be enabled. In further embodiments, a pump such as pump 340 can compensate for pressure losses within the system for desalination.

Figure 4:
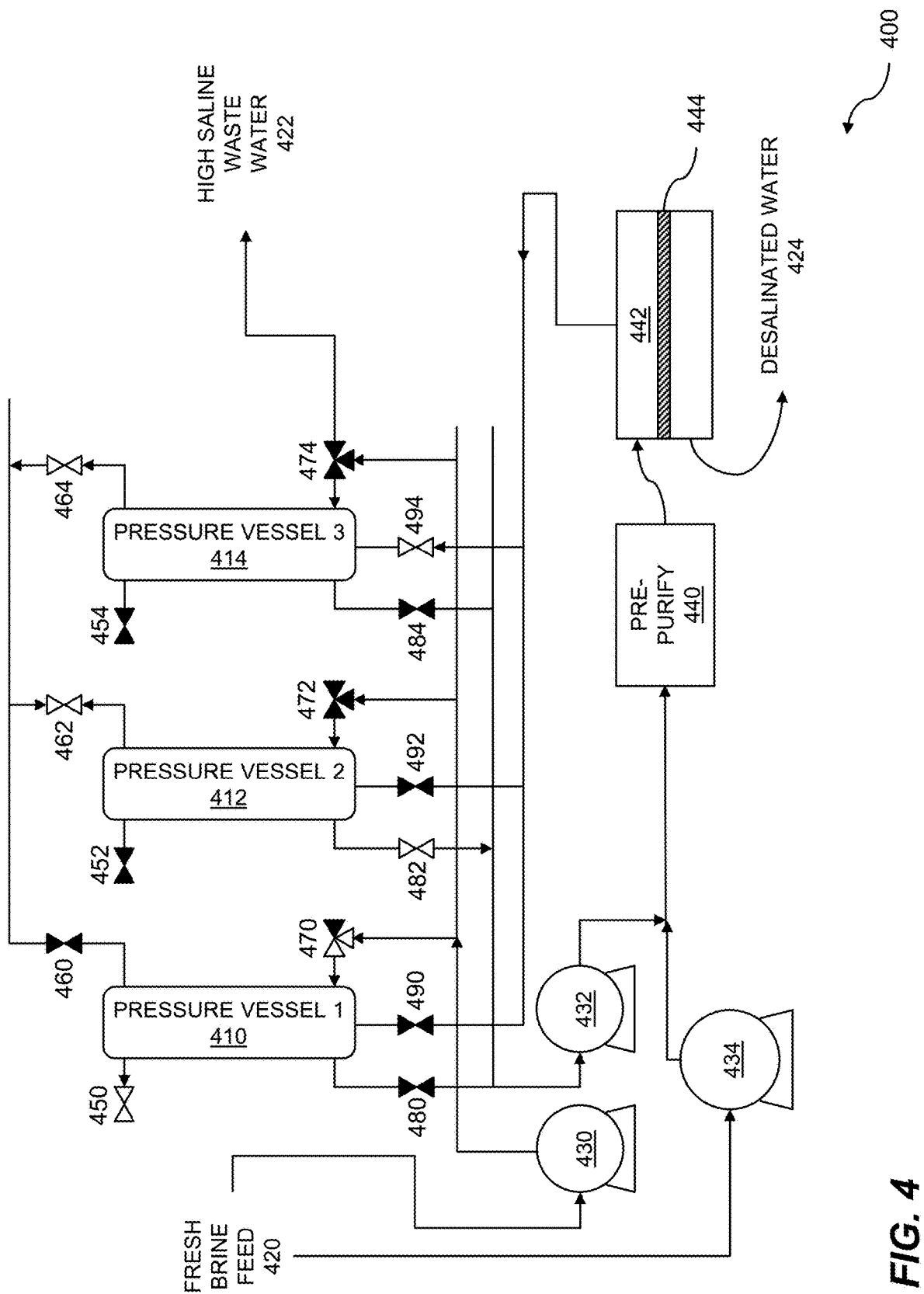
FIG. 4 is a system diagram for a gas-brine piston.

FIG. 4 is a system diagram for a gas-brine piston. A gas-brine piston can be used to enable a liquid purification system, such as a desalination system. The gas-brine piston can be used to force brine from a vessel into a reverse osmosis chamber, within which water can be separated from salt. Access to at least three pressure vessels is obtained, where the pressure vessels are interconnected using piping and computer-controlled switching valves. A first pressure vessel of the at least three pressure vessels is filled with brine, and a second pressure vessel of the at least three pressure vessels is filled with a pressurized gas, where the pressurized gas is sharp interface immiscible with brine. The switching valves are controlled to enable the pressurized gas in the second pressure vessel to enter the first pressure vessel and to force the brine from the first pressure vessel into a reverse osmosis chamber. The switching valves are controlled to enable a third pressure vessel of the at least three pressure vessels to fill with additional brine. Then the switching valves are controlled to enable the pressurized gas that entered the first pressure vessel to force the fresh brine from the third pressure vessel into the reverse osmosis chamber.

A diagram 400 for a gas-brine piston with at least 3 pressure vessels is shown. The gas-brine piston can operate with at least three pressure vessels such as PV 1 410, PV 2 412, PV 3 414, and so on. The pressure recovery/exchange techniques also use pipes, manifolds, and valves. Valves functioning as air vents, such as overhead valve air vents 450, 452, 454, and so on, enable the pressure vessels to fill and drain at ambient, or almost ambient, pressure. High pressure overhead valves 460, 462, 464, and so on enable high pressure gas to transfer between the pressure vessels. Bottom discharge valves 480, 482, 484, and so on enable brine to transfer from the pressure vessels to the reverse osmosis chamber for desalination. Bottom saline retentate valves 490, 492, 494, and so on enable the waste saline retentate to push pressurized gas from one pressure vessel into another, which acts as a piston to enable desalination. And the bottom drain/fill valves 470, 472, 474, and so on enable the waste saline retentate to drain from the pressure vessel and then to refill the pressure vessel with fresh brine to be desalinated. In embodiments, a low-head fill pump 430 can fill one of the pressure vessels, such as PV 1, with fresh brine feed 420, that is, a feed of additional, new brine. The fresh saline water feed can be fresh brine, saline water, seawater, and so on. In embodiments, the fresh saline water feed is brine. A pressure vessel such as PV 1 can be filled with fresh saline water when it is open to the ambient atmosphere, so that the pressure head in the pump can remain substantially similar to hydraulic head of the fresh brine. All valves can be closed except for an overhead air vent 450 and the bottom fill valve 470. When PV 1 is full, the overhead air vent 450 and the bottom fill valve 470 can be closed. A pressure vessel such as PV 1 can transfer or "dump" its charge of fresh saline water, through a discharge valve 480, to a reverse osmosis (RO) system 444, as described below. A pressure vessel such as PV 3 414 can drain high saline retentate waste water 422. In embodiments, PV 3 414 can drain high saline retentate waste water 422 through an open drain valve 474. The draining of PV 3 can occur under atmospheric pressure through an open overhead air vent 454, where all other valves except the air vent and the drain valves are closed. In embodiments, the hydraulic head can be recovered (not shown) or discarded. Upon completion of draining PV 3, the drain valve 474 switches and becomes a fill valve. Then PV 3 can be filled with fresh brine, saline water, seawater, and so on as described for PV 1 before. Then the overhead air vent and the bottom fill valve can be closed. The filling PV 3 or another pressure vessel can be accomplished using low-head fill pump 430.

The draining and filling of PV 3 described above can occur at substantially the same time other pressure vessels, such as PV 1 410 and PV 2 412, can be used for pressure recovery/exchange techniques. A pressure recovery/exchange technique can include a vessel such as PV 2 412 fully pressurized with a gaseous charge. In embodiments, the gaseous charge can comprise an air charge. The pressure of the gaseous charge within PV 2 can be substantially similar to an operating pressure of the RO chamber 444. RO chamber 444 can have a high pressure area 442 on the input side of the RO membrane. A retentate, such as a highly saline retentate, can be associated with a pressure substantially similar to the pressure of the RO chamber. The retentate can fill PV 2 through the bottom saline retentate valve 492 and can force a high-pressure column of gas up through a high-pressure overhead valve 462. The high-pressure overhead valve can be coupled to a high-pressure gas manifold, where the high-pressure manifold can be further coupled to PV 1. The high-pressure column of gas in PV 2 can transfer through the high-pressure manifold and overhead valve 460 into pressure vessel PV 1. PV 1 can be initially filled with a charge of fresh brine, saline water, seawater, etc. The high-pressure gas can force the fresh saline charge into the RO chamber through a fresh saline discharge valve 480 and a manifold. A booster pump such as pump 432 can be used to compensate for a small pressure drop (such as 1-3 bar) in the system. Alternatively, a compressed air chamber can be used to provide the booster pump function. Following completion of transferring the column of high-pressure gas from PV 2 to PV 1, the discharge valve 480 can close, the bottom saline retentate valve 490 can open, and PV 1 can be prepared to accept a high saline retentate from the RO chamber. In embodiments, the pressure vessels can switch their functions cyclically to enable continuous filling of the reverse osmosis chamber. In the example, the functions of pressure vessels PV 1 and PV 2 can be switched. Pressure vessel PV 2 can now be completely filled with high saline retentate and can be unable to accept additional high saline retentate. The bottom saline retentate valve 492 and the high-pressure gas overhead valve 462 can be closed. PV 2 can be drained by opening a smart overhead vent valve 452, and its bottom drain valve 472. Draining PV 2 can be substantially similar to the draining of PV 3 described previously. Desalinated liquid 424, such as water, can be removed from the RO chamber. In embodiments, the removing desalinated liquid can result from using a high-pressure pump 434 to directly feed fresh saline water, brine, seawater, etc., to the RO chamber. A pre-purify unit 440 can be implemented at the input of RO system 444, either as a discrete element or integrated in the RO system 444. The pre-purify unit 440 can provide an initial purification step as simple as screening out particulate matter in the prepurified liquid or brine, or as complex as providing an initial purification step using chemicals or even providing an initial reverse osmosis. In embodiments, the prepurified liquid is processed by an initial purification chamber before entering the reverse osmosis chamber.

In embodiments, the pressurized gas in a second pressure vessel provides a piston function to force the brine from a first pressure vessel. The high-pressure gas column or piston can remain within the gas-brine system, where the gas column can shuttle from one vessel to another by appropriately controlling one or more smart valves. When the gas-brine system is initially charged with one vessel-volume of high-pressure gas, the gas remains within the RO system. Periodic replenishment of the vessel-volume of high-pressure gas can be required to compensate for a portion of the volume of gas dissolving or entraining in the liquid brine, saline water, seawater, etc. In further embodiments, the RO system can remain substantially isothermal. Since the gas pressure can remain essentially constant, any work performed on the gas at the interface with the highly saline retentate can further be accomplished at the other interface between the gas and the fresh saline water. The gas serves as a gaseous piston, where the gas can keep the highly saline retentate water 422 separated from fresh saline water 420.

Figure 5:
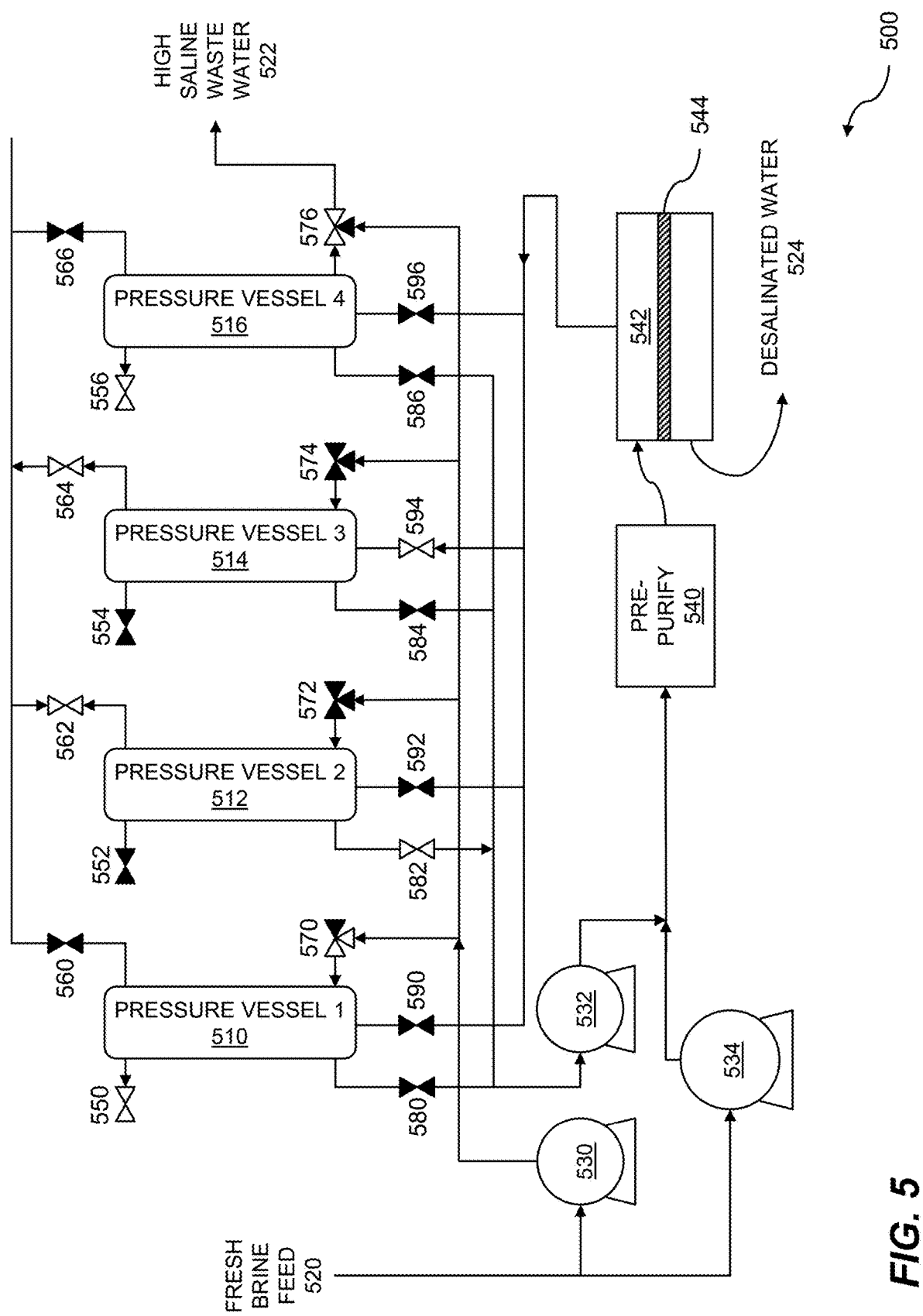
FIG. 5 is a system diagram for a gas-brine piston with a fourth vessel.

FIG. 5 is a system diagram for a gas-brine piston with a fourth vessel. Discussed throughout, a gas-brine piston can be used to enable a liquid purification system, such as a desalination system. The gas-brine piston can be used to force brine from a vessel into a reverse osmosis chamber, within which water can be separated from salt. The gas-brine piston with a fourth vessel can enable desalination using pressure vessels. Access to at least three pressure vessels is obtained, where the pressure vessels are interconnected using piping and computer-controlled switching valves. A first pressure vessel of the at least three pressure vessels is filled with brine and a second pressure vessel of the at least three pressure vessels with a pressurized gas, where the pressurized gas is sharp interface immiscible with brine. The switching valves are controlled to enable the pressurized gas in the second pressure vessel to enter the first pressure vessel and to force the brine from the first pressure vessel into a reverse osmosis chamber. The switching valves are controlled to enable a third pressure vessel of the at least three pressure vessels to fill with additional fresh brine. Then the switching valves are controlled to enable the pressurized gas that entered the first pressure vessel to force the fresh brine from the third pressure vessel into the reverse osmosis chamber.

A diagram 500 is shown for a gas-brine piston with a fourth vessel. The gas-brine piston can operate with at least three pressure vessels such as PV 1 510, PV 2 512, PV 3 514, PV 4 516, and so on. The pressure recovery/exchange techniques also use pipes, manifolds, and valves. Valves such as overhead air vents 550, 552, 554, 556, and so on enable the pressure vessels to fill and drain at ambient, or almost ambient, pressure. High pressure overhead valves 560, 562, 564, 566, and so on enable high pressure gas to transfer between the pressure vessels. Bottom discharge valves 580, 582, 584, 586, and so on enable brine to transfer from the pressure vessels to the reverse osmosis chamber for desalination. Bottom saline retentate valves 590, 592, 594, 596, and so on enable the waste saline retentate to push pressurized gas from one pressure vessel into another, which acts as a piston to enable desalination. And the bottom drain/fill valves 570, 572, 574, 576, and so on enable the waste saline retentate to drain from the pressure vessel and then to refill the pressure vessel with fresh brine to be desalinated. In embodiments, a low-head fill pump 530 fills one of the pressure vessels, such as PV 1, with fresh brine or saline water feed 520. The fresh saline water feed can be fresh brine, saline water, seawater, and so on. In embodiments, the fresh saline water feed is brine. The pressure vessel PV 1 can be open to the ambient atmosphere, so that the pressure head in the pump can remain substantially similar to hydraulic head of the fresh saline water. All valves can be closed except for an overhead air vent 550 and the bottom fill valve 570. When PV 1 is full, the overhead air vent 550 and the bottom fill valve 570 can be closed. PV 1 can transfer or "dump" its charge of fresh saline water, through a discharge valve 580, to a reverse osmosis (RO) system 544, as described below. While PV 1 is filling, an additional vessel such as PV 4 516 can drain high saline retentate water 522 through an open drain valve 576. The draining PV 4 can occur under atmospheric pressure through an open overhead air vent 556, where all other valves except the air vent and drain valves are closed. In embodiments, the hydraulic head can be recovered (not shown) or discarded. Upon completion of draining PV 4, the drain valve 576 switches and becomes a fill valve, and the pressure vessel can be filled with fresh brine, saline water, seawater, and so on. Then the overhead air vent and the bottom fill valve can be closed. The filling of PV 4 can be accomplished using low-head fill pump 530.

The filling or draining of pressure vessels described above can occur at substantially the same time other pressure vessels, such as PV 2 512 and PV 3 514, can be used for pressure recovery/exchange techniques. A pressure recovery/exchange technique can include a vessel such as PV 3 514 fully pressurized with a gaseous charge. In embodiments, the gaseous charge can comprise an air charge. The pressure of the gaseous charge within PV 3 can be substantially similar to an operating pressure of the RO chamber 544. RO chamber 544 can have a high pressure area 542 on the input side of the RO membrane. A retentate, such as a highly saline retentate, can be associated with a pressure substantially similar to the pressure of the RO chamber. The retentate can fill PV 3 through the bottom saline retentate valve 594 and can force a high-pressure column of gas up through a high-pressure overhead valve 564. The high-pressure overhead valve can be coupled to a high-pressure gas manifold, where the high-pressure manifold can be further coupled to PV 2. The high-pressure column of gas in PV 3 can transfer through the high-pressure manifold and overhead valve 562 into pressure vessel PV 2. PV 2 can be initially filled with a charge of fresh brine, saline water, seawater, etc. The high-pressure gas can force the fresh saline charge into the RO chamber through a fresh saline discharge valve 582 and a manifold. A booster pump such as pump 532 can be used to compensate for a small pressure drop (such as 1-3 bar) in the system. Alternatively, a compressed air chamber can be used to provide the booster pump function. Following completion of transferring the column of high-pressure gas from PV 3 to PV 2, the discharge valve 582 can close, the bottom saline retentate valve 592 can open, and PV 2 can be prepared to accept a high saline retentate from the RO chamber. In embodiments, the pressure vessels can switch their functions cyclically to enable continuous filling of the reverse osmosis chamber. In the example, the functions of pressure vessels PV 2 and PV 3 can be switched. Pressure vessel PV 3 can now be completely filled with high saline retentate and can be unable to accept additional high saline retentate. The bottom saline retentate valve 594 and the high-pressure gas overhead valve 564 can be closed. PV 3 can be drained by opening a smart overhead vent valve 554, and its bottom drain valve 574. Draining PV 3 can be substantially similar to the draining of PV 4 described previously. Desalinated liquid 524, such as water, can be removed from the RO chamber. In embodiments, the removing desalinated liquid can result from using a high-pressure pump 534 to directly feed fresh saline water, brine, seawater, etc., to the RO chamber. A pre-purify unit 540 can be implemented at the input of RO system 544, either as a discrete element or integrated in the RO system 544. The pre-purify unit 540 can provide an initial purification step as simple as screening out particulate matter in the prepurified liquid or brine or as complex as providing an initial purification step using chemicals or even providing an initial reverse osmosis.

In embodiments, the pressurized gas in a second pressure vessel provides a piston function to force the brine from a first pressure vessel. The high-pressure gas column or piston can remain within the gas-brine system, where the gas column can shuttle from one vessel to another by appropriately controlling one or more smart valves. When the gas-brine system is initially charged with one vessel-volume of high-pressure gas, the gas remains within the RO system. Periodic replenishment of the vessel-volume of high-pressure gas can be required to compensate for a portion of the volume of gas dissolving or entraining in the liquid brine, saline water, seawater, etc. In further embodiments, the RO system can remain substantially isothermal. Since the gas pressure can remain essential constant, any work performed on the gas at the interface with the highly saline retentate can further be accomplished at the other interface between the gas and the fresh saline water. The gas serves as a gaseous piston, where the gas can keep the highly saline retentate water 522 separated from the fresh brine feed 520.

Figure 6A:
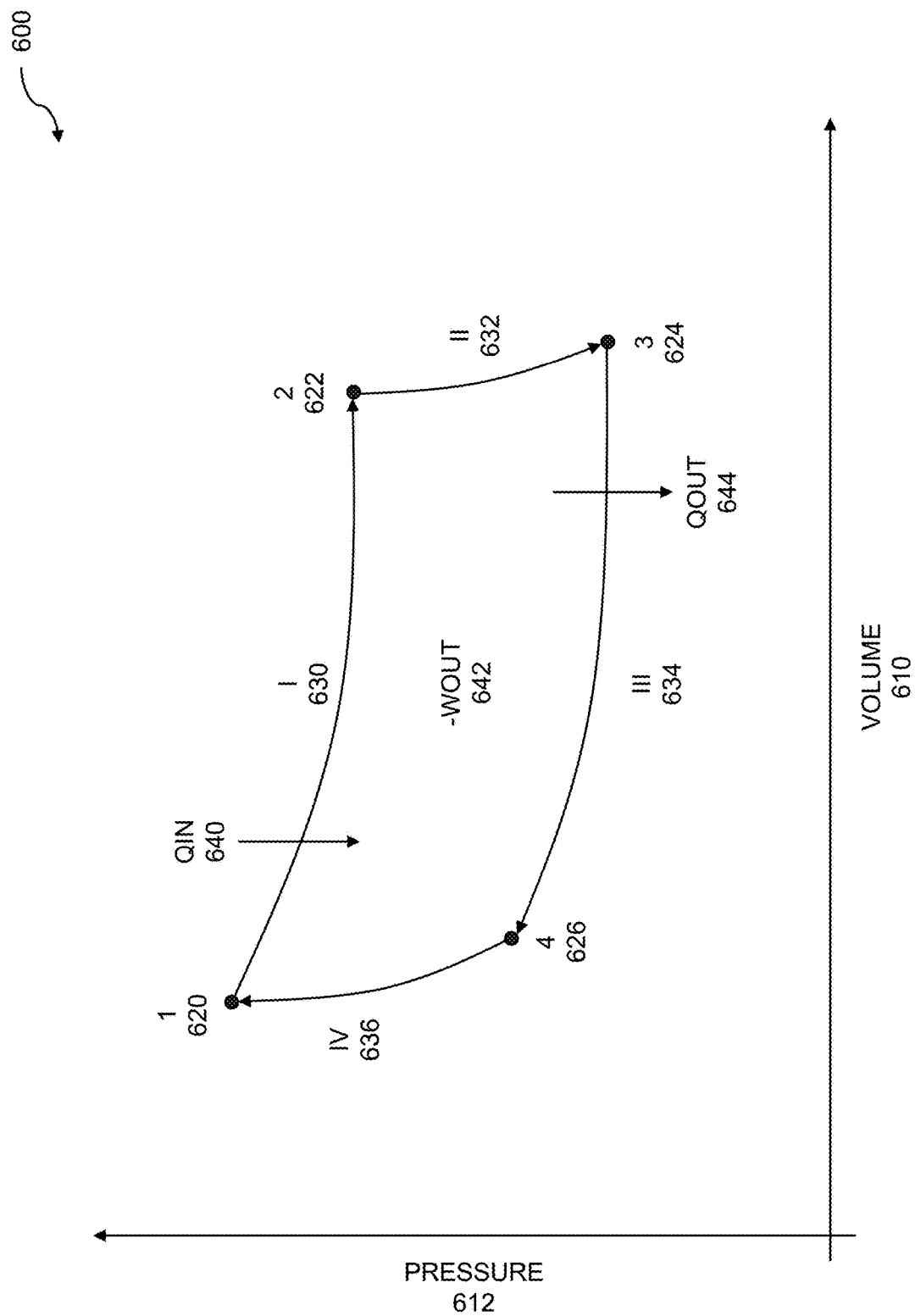
FIG. 6A illustrates adiabaticity in a heat transfer cycle.

FIG. 6A illustrates adiabaticity in a heat transfer cycle. An adiabatic process can occur when neither heat nor mass of a material is transferred between a given thermodynamic system and the environment that surrounds the thermodynamic system. "Adiabaticity" can describe a quality of the adiabatic process. For the techniques described herein, an adiabatic process with adiabaticity equal to zero percent is described as perfectly isothermal, while an adiabatic process with adiabaticity equal to 100 percent is described as perfectly adiabatic. In embodiments, the liquid purification system can comprise an isothermal operation among the at least three pressure vessels. Adiabaticity in a heat transfer cycle supports desalination using pressure vessels. Access to at least three pressure vessels is obtained, where the pressure vessels are interconnected using piping and computer-controlled switching valves. A first pressure vessel of the at least three pressure vessels is filled with brine and a second pressure vessel of the at least three pressure vessels is filled with a pressurized gas, wherein the pressurized gas is sharp interface immiscible with brine. The switching valves are controlled to enable the pressurized gas in the second pressure vessel to force the brine from the first pressure vessel into a reverse osmosis chamber upon entering the first pressure vessel. The pressurized gas in the second pressure vessel provides a piston function to force the brine from the first pressure vessel. The switching valves are controlled to enable a third pressure vessel of the at least three pressure vessels to fill with additional brine, wherein the additional brine, upon further controlling the switching valves, is forced into the reverse osmosis chamber by the pressurized gas that entered the first pressure vessel.

The figure shows a pressure-volume (PV) diagram 600. A PV diagram can be used to show changes in pressure 612 versus volume 610 for one or more thermodynamic processes. In embodiments, the liquid purification system can comprise an isobaric operation among the at least three pressure vessels. A cycle, such as a heat transfer cycle, can be based on the one or more thermodynamic processes. One lap around the cycle can complete the cycle, where the completed cycle can result in a net no change of system state. With reference to the PV diagram, at the end or completion of the cycle, the thermodynamic system state returns to a pressure and a volume equal to the pressure and the volume of the system at the beginning of the cycle. Four states are shown: state 1 620, state 2 622, state 3 624, and state 4 626. Each state (1 through 4) represents a pressure and a corresponding volume. While four states are shown, other numbers of states may be present for a given cycle. A path between two states can represent a process. Four processes are shown: process I 630, process II 632, process III 634, and process IV 636. While four processes are shown, other numbers of processes may be present within a given cycle.

A given process can affect a system pressure, a system volume, or both a system pressure and a system volume. For the heat transfer cycle shown, the processes can be isothermal (such as process I and process III), or adiabatic (such as process II and process IV). In general, the four processes shown can include isothermal expansion, such as between points 1 and 2; reversible adiabatic or isentropic expansion, such as between points 2 and 3; reversible isothermal compression, such as between points 3 and 4; and reversible adiabatic or isentropic compression, such as between points 3 and 4. Using the first law of thermodynamics, for a closed system, an amount of internal energy of the closed system can be calculated based on a quantity of input heat, such as input heat qin 640 minus an amount of work performed by the system, such as −wout 642. Any heat removed from the system, such as output heat qout 644 can be determined to be equal to the quantity of input heat minus work.

Figure 6B:
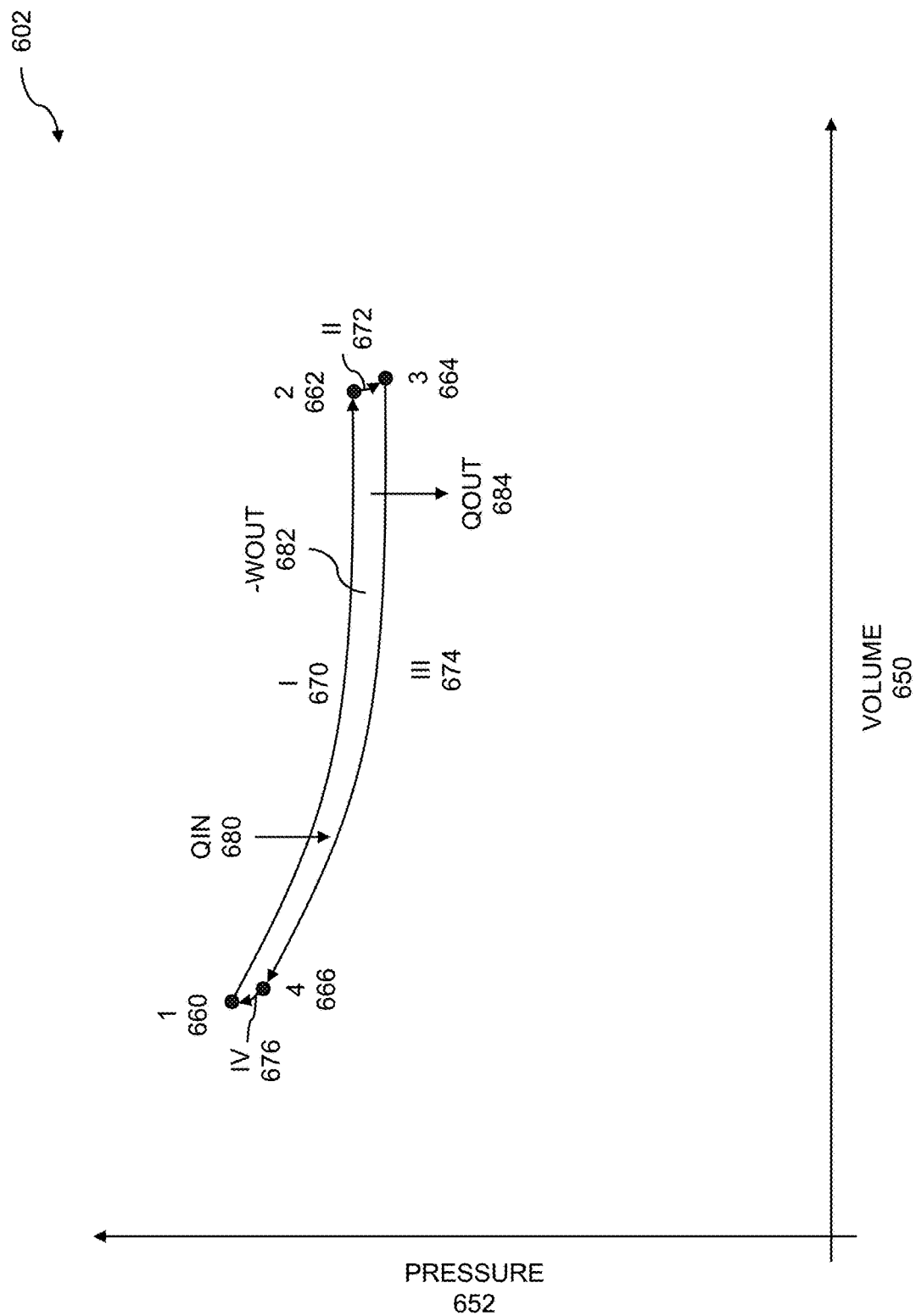
FIG. 6B illustrates an isothermal transfer cycle.

FIG. 6B illustrates an isothermal heat transfer cycle. A cycle of a thermodynamic system can include one or more thermodynamic processes. The thermodynamic processes can include isothermal processes and adiabatic processes. When the adiabaticity of adiabatic processes is nearly equal to zero, then the thermal dynamic system can be described approximately as an isothermal system. An isothermal heat transfer thermodynamic system can support desalination using pressure vessels. Access to at least three pressure vessels is obtained. A first pressure vessel of the at least three pressure vessels is filled with brine and a second pressure vessel of the at least three pressure vessels is filled with a pressurized gas. Switching valves are controlled to enable the pressurized gas in the second pressure vessel to force the brine from the first pressure vessel into a reverse osmosis chamber upon entering the first pressure vessel. The switching valves are controlled to enable a third pressure vessel of the at least three pressure vessels to fill with additional brine, wherein the additional brine is forced into the reverse osmosis chamber by the pressurized gas that entered the first pressure vessel.

A pressure-volume (PV) diagram 602 is shown in FIG. 6B. The PV diagram can plot pressure versus volume, and can show one or more states, where each state 1 through 4 comprises a pressure 652 and a corresponding volume 650. Four states are shown: state 1 660, state 2 662, state 3 664, and state 4 666. While four states are shown, other numbers of states may be present for a given cycle. A path between two states can represent a process. A process can include an isothermal process or an adiabatic process. A given process can impact the thermodynamic system by changing pressure, volume, or both pressure and volume. Four processes are shown: process I 670, process II 672, process III 674, and process IV 676. While four processes are shown, other numbers of processes may be present within a given cycle. For the isothermal heat transfer cycle shown, the processes process I and process III can be isothermal. The adiabatic processes, process II and process IV can be as close to zero possible. The adiabatic processes II and IV can have an adiabicity nearly equal to zero. Recall that for a closed thermodynamic system, an amount of internal energy of the closed system can be calculated based on a quantity of input heat, such as input heat qin 680 minus an amount of work performed by the system, such as −wout 682. Any heat removed from the system, such as output heat qout 684 can be determined to be equal to the quantity of input heat minus work.

Figure 7:
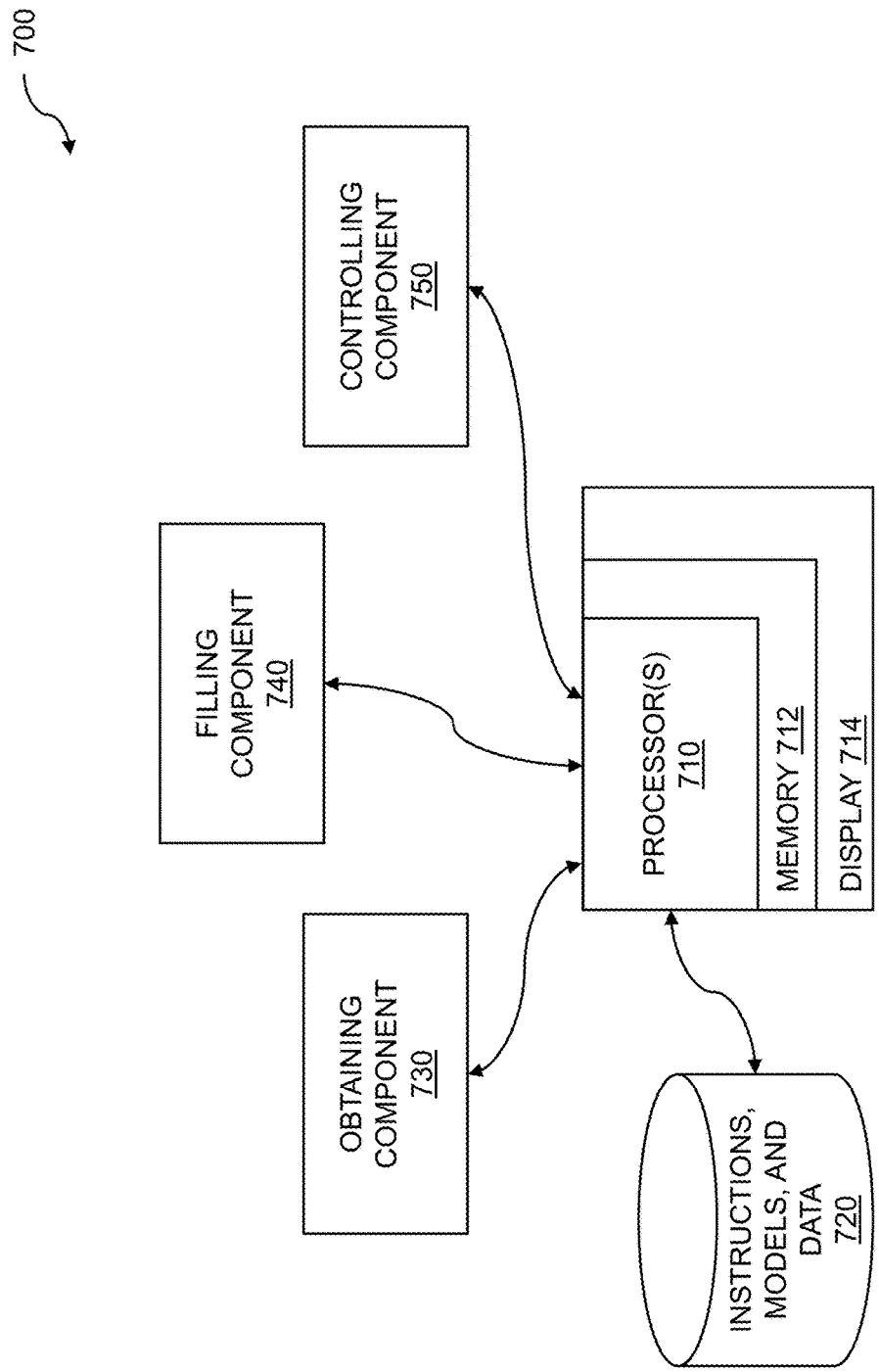
FIG. 7 is a system diagram for enabling a liquid purification system.

FIG. 7 is a system diagram for enabling a liquid purification system, such as a desalination system. Enabling a desalination system is based on desalination using pressure vessels. Access to at least three pressure vessels is obtained, where the pressure vessels are interconnected using piping and computer-controlled switching valves. A first pressure vessel of the at least three pressure vessels is filled with brine and a second pressure vessel of the at least three pressure vessels is filled with a pressurized gas, wherein the pressurized gas is sharp interface immiscible with brine. The switching valves are controlled to enable the pressurized gas in the second pressure vessel to force the brine from the first pressure vessel into a reverse osmosis chamber upon entering the first pressure vessel. The switching valves are controlled to enable a third pressure vessel of the at least three pressure vessels to fill with additional brine, wherein the additional brine, upon further controlling the switching valves, is forced into the reverse osmosis chamber by the pressurized gas that entered the first pressure vessel. The first pressure vessel, the second pressure vessel, and the third pressure vessel switch their functions cyclically to enable continuous filling of the reverse osmosis chamber. A fourth pressure vessel is enabled to fill with reverse osmosis retentate while the third pressure vessel fills with additional brine.

The system 700 can include one or more processors 710 and a memory 712 which stores instructions. The memory 712 is coupled to the one or more processors 710, wherein the one or more processors 710 can execute instructions stored in the memory 712. The memory 712 can be used for storing instructions, for storing databases for liquid purification systems, for storing switching valve configurations, and the like. Information regarding liquid purification using pressure vessels for enabling a desalination system can be shown on a display 714 connected to the one or more processors 710. The display can comprise a television monitor, a projector, a computer monitor (including a laptop screen, a tablet screen, a netbook screen, and the like), a smartphone display, a mobile device, or another electronic display. The system 700 includes instructions, models, and data 720. The data can include information on desalination systems, control of switching valves or smart valves, metadata about desalination, and the like. In embodiments, the instructions, models, and data 720 are stored in a networked database, where the networked database can be a local database, a remote database, a distributed database, and so on. The instructions, models, and data 720 can include instructions for obtaining access to at least three pressure vessels, where the pressure vessels are interconnected using piping and computer-controlled switching valves. The instructions, models, and data can further include instructions for filling a first pressure vessel of the at least three pressure vessels with brine and a second pressure vessel of the at least three pressure vessels with a pressurized gas, wherein the pressurized gas is sharp interface immiscible with brine. The instructions, models, and data can further include instructions for controlling switching valves which enable the pressurized gas in the second pressure vessel to force the brine from the first pressure vessel into a reverse osmosis chamber upon entering the first pressure vessel. The instructions can further include instructions for controlling the switching valves to enable a third pressure vessel of the at least three pressure vessels to fill with additional brine, wherein the additional brine, upon further controlling the switching valves, is forced into the reverse osmosis chamber by the pressurized gas that entered the first pressure vessel.

The system 700 includes an obtaining component 730. The obtaining component 730 can obtain access to at least three pressure vessels, where the pressure vessels are interconnected using piping and computer-controlled switching valves. The pressure vessels can include high pressure vessels. The piping can include pressure amplification pipes. The computer-controlled switching valves can include valves that can be controlled by a processor such as a microprocessor. The computer-controlled switching valves can include smart valves, where the smart valves can include sensors, actuators, and so on. The system 700 includes a filling component 740. The filling component 740 can fill a first pressure vessel of the at least three pressure vessels with brine and a second pressure vessel of the at least three pressure vessels with a pressurized gas, wherein the pressurized gas is sharp interface immiscible with brine. The brine can include seawater or other "salty" water. The pressurized gas can include a variety of sharp interface immiscible gases. In embodiments, the pressurized gas that is sharp interface immiscible with brine can include air. The pressure at which the first pressure vessel is filled can include high pressure, low pressure, and so on. In embodiments, the first pressure vessel is filled with prepurified liquid, such as brine, at low pressure. The low pressure can include a low pressure that is substantially equal to the pressure of an input brine feed.

The system 700 includes a controlling component 750. The controlling component can include controlling the switching valves to enable the pressurized gas in the second pressure vessel to force the brine from the first pressure vessel into a reverse osmosis (RO) chamber upon entering the first pressure vessel. In embodiments, the pressurized gas in the second pressure vessel provides a piston function to force the brine out of the first pressure vessel. The brine that is forced from the first pressure vessel into the reverse osmosis chamber can be pressured to improve the osmosis processes. In embodiments, the pressurizing can be enabled by a booster pump between the first pressure vessels and the reverse osmosis chamber. The controlling component can further include controlling the switching valves to enable a third pressure vessel of the at least three pressure vessels to fill with additional brine, wherein the additional brine, upon further controlling the switching valves, is forced into the reverse osmosis chamber by the pressurized gas that entered the first pressure vessel. The plurality of pressure vessels can be used to enhance the filling of the RO chamber. In embodiments, the first pressure vessel, the second pressure vessel, and the third pressure vessel switch their functions cyclically to enable continuous filling of the reverse osmosis chamber. The pressurized gas can be used to force the brine from various vessels into the RO chamber. In embodiments, the continuous filling provides for movement of the pressurized gas cyclically from pressure vessel to pressure vessel. Further pressure vessels can be used to force brine to the RO chamber. In embodiments, a fourth pressure vessel is enabled to fill with reverse osmosis retentate while the third pressure vessel fills with additional brine. Additional vessels can be used for reverse osmosis management. In embodiments, the functions of the third and fourth pressure vessels rotate cyclically as a pair to enable reverse osmosis retentate management.

The system 700 can enable a computer program product embodied in a non-transitory computer readable medium for enabling a liquid purification system, the computer program product comprising code which causes one or more processors to perform operations of: obtaining access to a set of at least three pressure vessels, where the pressure vessels are interconnected using piping and computer-controlled switching valves; filling a first pressure vessel of the set with a prepurified liquid and a second pressure vessel of the set with a pressurized gas, wherein the pressurized gas is sharp interface immiscible with the prepurified liquid; controlling the switching valves to enable the pressurized gas in the second pressure vessel to force the prepurified liquid from the first pressure vessel into a reverse osmosis chamber; and controlling further the switching valves to enable a third pressure vessel of the set to fill with additional prepurified liquid, wherein the additional prepurified liquid, upon further controlling the switching valves, is forced into the reverse osmosis chamber by the pressurized gas that entered the first pressure vessel.

The system 700 can provide a computer system for enabling a liquid purification system comprising: a memory which stores instructions; one or more processors coupled to the memory wherein the one or more processors, when executing the instructions which are stored, are configured to: obtain access to a set of at least three pressure vessels, where the pressure vessels are interconnected using piping and computer-controlled switching valves; fill a first pressure vessel of the set with a prepurified liquid and fill a second pressure vessel of the set with a pressurized gas, wherein the pressurized gas is sharp interface immiscible with the prepurified liquid; control the switching valves to enable the pressurized gas in the second pressure vessel to force the prepurified liquid from the first pressure vessel into a reverse osmosis chamber; and control further the switching valves to enable a third pressure vessel of the set to fill with additional prepurified liquid, wherein the additional prepurified liquid, upon further controlling the switching valves, is forced into the reverse osmosis chamber by the pressurized gas that entered the first pressure vessel.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for enabling a liquid purification system comprising:
   obtaining access to a set of at least three pressure vessels, where the pressure vessels are interconnected using piping and computer-controlled switching valves;
   filling a first pressure vessel of the set with a prepurified liquid and filling a second pressure vessel of the set with a pressurized gas, wherein the pressurized gas is sharp interface immiscible with the prepurified liquid;
   controlling the switching valves to enable the pressurized gas in the second pressure vessel to force the prepurified liquid from the first pressure vessel into a reverse osmosis chamber; and
   controlling further the switching valves to enable a third pressure vessel of the set to fill with additional prepurified liquid, wherein the additional prepurified liquid, upon further controlling the switching valves, is forced into the reverse osmosis chamber by the pressurized gas that entered the first pressure vessel.

2. The method of claim 1 wherein the first pressure vessel, the second pressure vessel, and the third pressure vessel switch their functions cyclically to enable continuous filling of the reverse osmosis chamber.

3. The method of claim 2 wherein the continuous filling provides for movement of the pressurized gas cyclically from pressure vessel to pressure vessel.

4. The method of claim 1 further comprising a fourth pressure vessel, wherein the fourth pressure vessel is enabled to fill with reverse osmosis retentate while the third pressure vessel fills with additional prepurified liquid.

5. The method of claim 4 wherein function of the third and fourth pressure vessels rotate cyclically as a pair to enable reverse osmosis retentate management.

6. The method of claim 4 wherein the fourth pressure vessel enables liquid purification system bootstrapping using only pressurized prepurified liquid.

7. The method of claim 6 wherein the bootstrapping is initialized by a high-pressure pump.

8. The method of claim 7 wherein the high-pressure pump pressurizes an input prepurified liquid feed to a reverse osmosis pressure.

9. The method of claim 6 wherein the bootstrapping is initialized by a pressurized gas pressure vessel.

10. The method of claim 1 wherein the first pressure vessel is filled with prepurified liquid at low pressure.

11. The method of claim 10 wherein the low pressure is substantially equal to the pressure of an input prepurified liquid feed.

12. The method of claim 11 wherein the low pressure is within 10% of a head pressure of the input prepurified liquid feed.

13. The method of claim 1 wherein the prepurified liquid comprises brine.

14. The method of claim 13 wherein the brine comprises seawater.

15. The method of claim 1 wherein the liquid purification system provides desalination.

16. The method of claim 1 wherein the pressurized gas is air.

17. The method of claim 1 further comprising enabling additional pressurization of the prepurified liquid that is forced from the first pressure vessel into the reverse osmosis chamber.

18. The method of claim 17 wherein the pressurizing is enabled by a booster pump between the first pressure vessels and the reverse osmosis chamber.

19. The method of claim 17 wherein the pressurizing is enabled by a pressurized gas pressure vessel.

20. The method of claim 1 wherein the prepurified liquid is processed by an initial purification chamber before entering the reverse osmosis chamber.

21. The method of claim 1 wherein the pressurized gas in the second pressure vessel provides a piston function to force the prepurified liquid from the first pressure vessel.

22. The method of claim 1 wherein the purification system comprises an isothermal operation among the set of at least three pressure vessels.

23. The method of claim 1 wherein the purification system comprises an isobaric operation among the set of at least three pressure vessels.

24. The method of claim 1 further comprising additional pressure vessels to enable one or more of initial purification, final purification, and distribution of the prepurified liquid.

25. A computer program product embodied in a non-transitory computer readable medium for enabling a liquid purification system, the computer program product comprising code which causes one or more processors to perform operations of:
    obtaining access to a set of at least three pressure vessels, where the pressure vessels are interconnected using piping and computer-controlled switching valves;
    filling a first pressure vessel of the set with a prepurified liquid and filling a second pressure vessel of the set with a pressurized gas, wherein the pressurized gas is sharp interface immiscible with the prepurified liquid;
    controlling the switching valves to enable the pressurized gas in the second pressure vessel to force the prepurified liquid from the first pressure vessel into a reverse osmosis chamber; and
    controlling further the switching valves to enable a third pressure vessel of the set to fill with additional prepurified liquid, wherein the additional prepurified liquid, upon further controlling the switching valves, is forced into the reverse osmosis chamber by the pressurized gas that entered the first pressure vessel.

26. A computer system for enabling a liquid purification system comprising:
    a memory which stores instructions;
    one or more processors coupled to the memory wherein the one or more processors, when executing the instructions which are stored, are configured to:
        obtain access to a set of at least three pressure vessels, where the pressure vessels are interconnected using piping and computer-controlled switching valves;
        fill a first pressure vessel of the set with a prepurified liquid and a fill second pressure vessel of the set with a pressurized gas, wherein the pressurized gas is sharp interface immiscible with the prepurified liquid;
        control the switching valves to enable the pressurized gas in the second pressure vessel to force the prepurified liquid from the first pressure vessel into a reverse osmosis chamber; and
        control further the switching valves to enable a third pressure vessel of the set to fill with additional prepurified liquid, wherein the additional prepurified liquid, upon further controlling the switching valves, is forced into the reverse osmosis chamber by the pressurized gas that entered the first pressure vessel.

* * * * *